United States Patent
Yializis et al.

(10) Patent No.: US 8,815,337 B2
(45) Date of Patent: Aug. 26, 2014

(54) METHODS FOR FABRICATION OF POLYMER-BASED OPTICALLY VARIABLE DEVICES

(75) Inventors: Angelo Yializis, Tucson, AZ (US); Gordon Goodyear, Tucson, AZ (US)

(73) Assignee: Sigma Laboratories of Arizona, LLC, Tucson, AZ (US)

( * ) Notice: Subject to any disclaimer, the term of this patent is extended or adjusted under 35 U.S.C. 154(b) by 664 days.

(21) Appl. No.: 13/091,635

(22) Filed: Apr. 21, 2011

(65) Prior Publication Data

US 2012/0270020 A1 Oct. 25, 2012

(51) Int. Cl.
*B05D 5/06* (2006.01)
*B29D 11/00* (2006.01)

(52) U.S. Cl.
CPC .................................. *B29D 11/0074* (2013.01)
USPC ........... 427/162; 427/164; 427/166; 427/551; 427/553

(58) Field of Classification Search
USPC .................. 427/551, 553, 161, 162, 164, 166
See application file for complete search history.

(56) References Cited

U.S. PATENT DOCUMENTS

| | | | |
|---|---|---|---|
| 6,503,564 B1 * | 1/2003 | Fleming et al. | 427/255.6 |
| 2006/0151989 A1 * | 7/2006 | Muke et al. | 283/67 |
| 2007/0296204 A1 * | 12/2007 | Phillips et al. | 283/72 |
| 2008/0106002 A1 * | 5/2008 | Feldman et al. | 264/400 |
| 2008/0218817 A1 * | 9/2008 | Grygier et al. | 359/9 |
| 2009/0034082 A1 * | 2/2009 | Commander et al. | 359/619 |
| 2009/0324856 A1 | 12/2009 | Argoitia | |
| 2011/0317271 A1 * | 12/2011 | Dunn et al. | 359/619 |

FOREIGN PATENT DOCUMENTS

EP 0395410 A2 * 4/1990

OTHER PUBLICATIONS

Zhou, Jiwei, et al., "Liquid crystal optically variable device with continuously distributed colors". Optical Engineering 50(8), 081203 (Aug. 2011), pp. 1-6.*
Hardwick, Bruee, et al., "Guardian TMSubstrate as an Optical Medium for Security Devices". Note Printing Australia Limited 2004, pp. 1-5.*
Schadt, Martin, et al., "Photo-Induced Alignment and Patterning of Hybrid Liquid Crystalline Polymer Films on Single Substrates". Jpn. J. Appl. Phys. vol. 34 (1995) pp. L764-L767, Part 2, No. 6B, Jun. 15, 1995.*

* cited by examiner

*Primary Examiner* — Bret Chen
(74) *Attorney, Agent, or Firm* — Yakov Sidorin; Quarles & Brady LLP; Antonio R. Durando

(57) ABSTRACT

Polymer-based optically-variable devices (OVDs) for security applications and methods for producing the same. The uniformity of thickness of the structure of such devices is optimized by controlling previously neglected process parameters such as the temperature distribution of the deposition nozzle, the substrate and the deposition drum, their emissivities, the micro-roughness of the substrate, and the rate of monomer re-evaporation. Re-evaporation is minimized by initiating radiation-curing within two seconds of monomer deposition. A method includes equipment reducing all sources of emissivity non-homogeneities, such as surface blemishes in the surface areas exposed to the substrate to preferentially fabricate substrates with haziness less than 5% and gloss greater than 90%. Controlling, a maximum variation of thickness of the transmissive layer of an OVD ensures that no appreciable color-shift variation is visible to the naked eye.

20 Claims, 4 Drawing Sheets

METHODS FOR FABRICATION OF POLYMER-BASED OPTICALLY VARIABLE DEVICES

BACKGROUND OF THE INVENTION

1. Field of the Invention

This invention is related in general to optically variable devices (OVDs) and, in particular, to vacuum-deposited polymer-based multilayer OVD structures.

2. Description of the Related Art

Optically variable devices are becoming ever more popular as tools to provide security for documents and products subject to counterfeiting, forgery, and/or diversion. Matching the proper security feature for its intended function, determining the method of the security feature's authenticity, and incorporating effective anti-counterfeiting protection for the OVD itself are all important issues faced during the design and implementation of OVDs for a specific security application. The OVD can be used as a stand-alone feature or can be combined with more conventional printed security items to create devices that are extremely difficult to replicate using photocopy or scanning technologies.

A recent development in the field has been the introduction of the OVD stripe. Generally, the stripe is an OVD continuous pattern applied at a width of about 10 mm or less. The benefit of stripes is that application speeds are very high, which reduces the unit cost of the process and makes OVD stripe application ideal for large runs, such as for banknotes. Typically, banknote stripes are designed to produce a specific color shift as the stripe is rotated with respect to a viewer (that is, by changing the angle of incidence of the light directed to the OVD). Of particular interest to the present invention are OVDs that consist of vapor-deposited etalon structures (so called Fabry-Perot structures) that produce color shifting as a result of interference effects after each wavelength is reflected from the parallel mirrors separated by the etalon spacer layer. As one skilled in the art would readily understand, such an etalon consists of multiple layers of materials, each having a complex index of refraction with real and imaginary parts that determine the reflectance, absorbance and transmittance of the layer. The materials are selected so that a light beam incident on a proximal layer of the etalon is in part reflected and in part transmitted through intermediate spacer layers to a distal layer, where a portion of the transmitted light is reflected and returned to interfere with the light reflected by the proximal layer. Those skilled in the art will also readily understand that the absorbance of the material has an affect on the color of the of the light seen by an observer of the device. Security devices produced with an evaporated monomer/polymer spacer layer are materially more flexible than conventional devices produced with inorganic spacer layers, such as MgF2, LiF, CaF, SiO2, Al2O3, etc. Such flexibility prevents crazing in applications where the OVD may be wrinkled (as in banknote applications). The lower temperature of vapor deposition also allows thinner films to be used as substrates.

It is known that the color shift produced by an etalon structure results from the phase difference between the two beams reflected by each etalon mirror after one traverses the spacer layer. In U.S. Pat. No. 6,214,422, Yializis teaches a polymeric etalon structure where the spacer layer is formed by condensation of a vapor-deposited monomer that is polymerized by exposure to radiation in vacuum. In U.S. Pat. No. 5,877,895, Shaw teaches similar color shifting structures built on a substrate with variable-thickness polymeric coatings, so as to yield different colors by changing the optical thickness of the polymers layer. This is achieved by altering process parameters such as by differentially cooling/heating the substrate and by varying the degree of cross-linking of the monomer layers.

Conventional inorganic spacer layers are deposited over the substrate as solid conformal coatings. Therefore, the spacer layer acquires a substantially uniform thickness over the roughness and imperfections of the substrate's surface. This results in a relatively uniform color shift, especially when viewed under a microscope. Spacer layers have also been deposited as organic liquid layers by vapor deposition of a monomer followed by polymerization. However, in the case of such vapor-deposited spacer layers, as illustrated in FIG. 1 with reference to a rough substrate 10 coated with a thin partially-transparent and partially-reflective metal layer 12, instead of forming a conformal coating over the substrate, the monomer is condensed as a liquid layer that wets and covers the substrate's non-uniformities (through the uniform metal layer 12), thereby producing a spacer layer 14 with a microrough surface 16 adhered to the metal layer 12 and a level surface 18 on the side in contact with the reflective metallic layer 20, which reduces the uniformity of the interference color shift. This effect is illustrated by the difference in the spacer-layer thickness traversed by the two wavefronts L and L' shown in the figure. Therefore, vapor-deposited spacer layers have not yet achieved the degree of precision necessary to produce OVDs with the accurate and repeatable performance required for security applications. In spite of repeated experimentation to produce a structure with a spacer layer of precisely uniform thickness by vapor deposition, random color variations have remained an unsolved problem in the art. What is required is a product that exhibits a consistent color shift without significant variations that can be detected by the naked eye. This invention addresses this problem, particularly for the production of precision OVDs for bank notes and other security related applications.

BRIEF SUMMARY OF THE INVENTION

The invention is directed to the manufacture of etalon structures based on vapor-deposited polymer spacer layers suitable for color-shifting optical devices, in particular OVDs used in banknotes for security purposes. The primary aspect of the invention lies in the discovery that heretofore neglected material properties of the substrate and monomer formulation and deposition parameters, such as the temperature distribution of the deposition nozzle, the substrate and the deposition drum (if present), their emissivity distributions, the microroughness and haziness of the substrate, and the rate of monomer re-evaporation, all contribute to the overall heat transfer mechanisms that determine the thickness distribution of the deposited layer. Inasmuch as the uniformity of thickness of the etalon spacer layer determines the uniformity of the color-shifting properties of the resulting etalon structure, the requirements for visual security devices demand that strict layer thickness specifications be met during deposition. A maximum thickness variation of about 5% (less than about 1% being preferred) ensures that no appreciable color-shift variation is visible to the naked eye, an important and sufficient parameter for banknote and similar security applications (such as for security labels and articles of value).

The overall thickness of the polymer spacer layer is the net result of the initial condensation and the partial re-evaporation of the monomer prior to polymerization. Both must be spatially consistent over the area of the OVD in order to obtain a spacer layer of uniform thickness. However, it was discovered that the monomer formulations used to make OVD etalon spacer layers in vacuum undergo irregular re-evaporation due to temperature and emissivity variations across the substrate area covered by deposition. These differences in the rate of re-evaporation produce spacer-layer thickness non-uniformities (i.e., thickness variations greater than about 5%) and, correspondingly, unacceptable color-shifting variations. Therefore, according to another aspect of the invention, the velocity of the substrate is controlled and the radiation polymerization unit (such as an electron beam curtain) is preferably placed with respect to the monomer deposition nozzle so as to ensure that the liquid monomer is exposed to the polymerization unit within two seconds after deposition. This curing delay time was found to be an important parameter to minimize differential re-evaporation, thereby neutralizing the effects of temperature and emissivity variations on the thickness uniformity of the spacer layer.

Similarly, we found that the spatial emissivity distribution of the nozzle, the substrate and the drum, when one is used, all also contribute to the overall uniformity of thickness of the deposited monomer layer. In particular with reference to the nozzle, a variation in emissivity greater than 0.1 over the span of nozzle deposition on the substrate can produce spacer-layer thickness non-uniformities that result in visible color-shift variations. Therefore, the emissivity of the nozzle should be monitored for uniformity during the deposition process. In addition, all factors that could result in surface emissivity non-homogeneities, such as spots, blemishes and the like, should be eliminated in the substrate and the surface areas exposed to the substrate receiving the deposited monomer.

Finally, we also learned that the micro-roughness of the substrate is another parameter that can contribute to overall color-shift non-uniformity of the OVDs produced by vapor deposition. To that end, everything else being the same, substrates with haziness less than 5% (preferably less than 1%) and gloss greater than 90% (preferably greater than 95%) result in OVD structures with no significant color-shift variation to the naked eye.

Various other purposes and advantages of the invention will become clear from its description in the specification that follows and from the novel features particularly pointed out in the appended claims. Therefore, the invention consists of the features hereinafter illustrated in the drawings, fully described in the detailed description of the preferred embodiments and particularly pointed out in the claims.

DETAILED DESCRIPTION OF THE PREFERRED EMBODIMENTS OF THE INVENTION

The invention relates to the spacer layer sandwiched between the two layers of an etalon structure and to deposition conditions that ensure the thickness uniformity of the spacer layer. Therefore, for the purposes of this description the term "substrate" is used throughout interchangeably to refer to the substrate supporting the etalon structure as well as to the metallized substrate over which the spacer layer is deposited, the specific meaning being clear from the context.

The invention lies in the combination of process parameters derived from multiple discoveries related to the various factors that affect the uniformity of thickness of etalon spacer layers formed by vapor deposition. When depositing an organic vapor coating on a substrate, it is first condensed as a liquid film by heat transfer to the substrate's surface. If the film is deposited on a surface that has areas of non-uniform temperature, a corresponding differential cooling effect and condensation rate result that produce subtle variations in the thickness distribution of the film over the substrate, particularly in the case of large deposition areas. Furthermore, prior to polymerization the deposited monomer is subject to partial re-evaporation that occurs between the deposition station and the curing station, which again is affected by the temperature of the substrate. Variations in temperature produce different degrees of re-evaporation, which, in turn, also contribute to ultimate differences in the thickness of the spacer layer. Therefore, the temperature of the substrate and of other heat-radiating materials in the process space must be kept uniform, especially for the production of large etalon structures that are later reduced to smaller OVDs applied to banknotes and similarly secured products that require an identical color shift.

Figure 1:
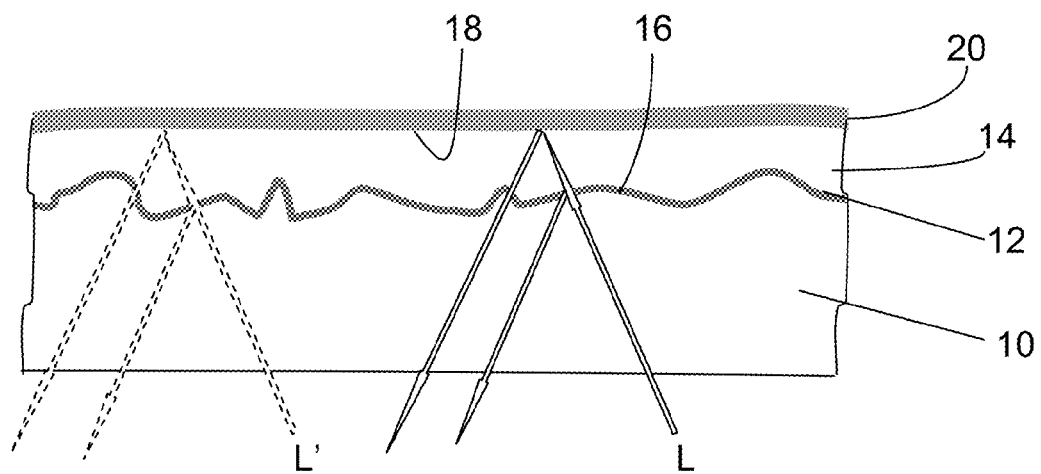
FIG. 1 is a sectional illustration of the spacer layer of an etalon structure produced by conventional vapor deposition of a liquid monomer and radiation curing.
Figure 2:
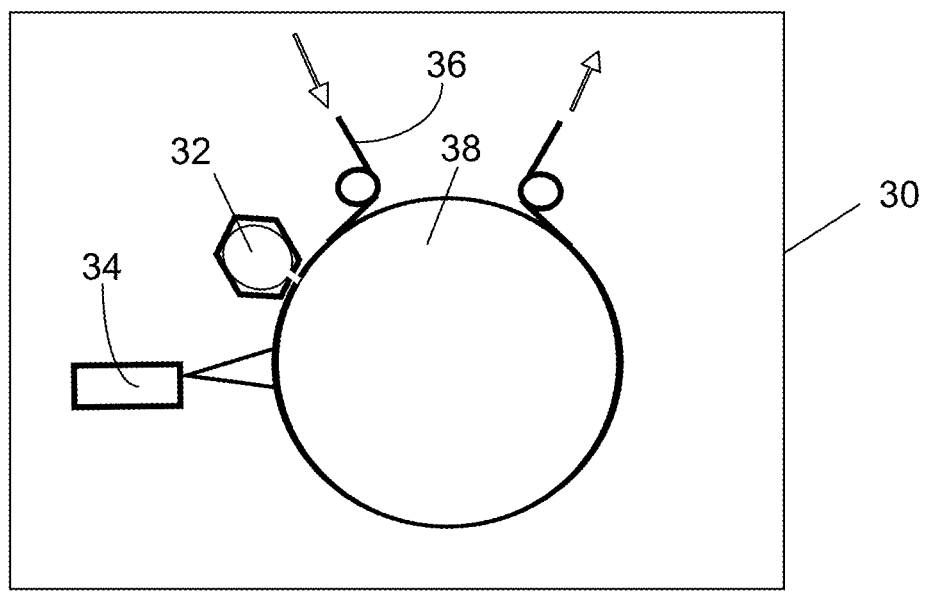
FIG. 2 is a schematic representation of a vacuum chamber adapted to manufacture etalon structures for OVD applications by vapor deposition and radiation curing.

The invention may be carried out using the apparatus described in the prior art for vapor deposition, in particular for flash-evaporation and condensation in vacuum (see U.S. Pat. No. 4,954,371, for example), modified only as necessary to operate within the process parameters described herein. Referring to FIG. 2, a conventional vacuum chamber 30 is equipped with a monomer delivery nozzle 32 and a radiation-curing unit 34, such as an electron beam. A moving substrate 36, such as a polymer film, is passed sequentially through the assembly of units over a process drum 38 at speeds typically ranging from 10 to 500 meter/min. The deposition of inorganic layers can be performed inline with the polymer deposition or in separate steps. Alternatively, the substrate 36 may be coated with the polymer layer in a free-span operation without a drum.

The curing station 34 may be any conventional unit capable of curing the liquid monomer deposited on the substrate 36. While an electron-gun is preferred, curing can be achieved as well by exposure to radiation produced by other well-known means, such as a plasma/ion source, an infrared lamp, an ultraviolet lamp, or a visible light source. In the last two cases, an appropriate photoinitiator is added to the monomer prior to vaporization.

When a process drum is used, we found that any difference in temperature between the process drum and the web substrate (typically a polymeric film), including temperature differences that result from incomplete contact between the drum and the film, create non-uniformities in the temperature distribution of the substrate that produce variations in thickness of the deposited layer and therefore also in color-shift properties across the coated polymer web. Thus, we found that keeping the substrate and the drum at the same temperature is of utmost importance in order to reduce the thickness non-uniformities of the spacer layer that cause color-shift variations in the OVD product. This discovery is significant because it is contrary to the normal practice in the art where the vaporized monomers are deposited over a substrate (typically at room-temperature) in contact with a very cold drum in order to improve the efficiency of condensation. Therefore, unlike prior-art teachings of a cold process drum, in order to achieve uniformity of color-shift in OVDs produced by vapor deposition, it is highly recommended that determined efforts be made to keep the drum and the substrate at the same temperature.

The same holds true while cooling the film to some low temperature by contact with process rollers. Color-shift variations due to thickness non-uniformities of the spacer layer have also been found to increase due to non-uniform contact with process rollers, which results in non-uniform heat loss that in turn leads to a non-uniform coating thickness.

These observations were confirmed in several experiments using a 75-micron-thick PET film metallized with a semi-transparent layer of several different metals including aluminum, chromium and stainless steel. Various monomer formulations were deposited on the metallized layer at various drum speeds ranging for about 10 m/min to 500 m/min. The monomer layers were polymerized with an electron beam curtain to produce polymer spacer layers with a thickness ranging from 0.20 to 0.55 microns. The substrate was fed into the vacuum chamber approximately at room temperature and the process drum was originally cooled at temperatures as low as 260° K. The polymerized layers were coated with a relatively opaque aluminum layer to form an optically variable structure when viewed through the PET film substrate. The resultant color-shifting properties, as expected, varied with the thickness of the polymer spacer layer, but close examination showed that the color shift also varied locally and randomly across the web in patterns that resembled water stains on a surface. The temperature of the drum was then raised to match the temperature of the PET substrate (about 297° K—approximately room temperature) and the random color-shift variations (water-stain like) were eliminated when viewed with the naked eye.

In practice the specification for banknotes and similar applications is that the color-shifting properties of the etalon structure be uniform to the naked eye. Therefore, this discovery enabled the vacuum-deposition formation of spacer layers suitable for such security applications. The improvement in color-shift uniformity was consistent and repeatable and clearly attributable to the fact that the monomer was condensed over a PET substrate film kept at the same temperature as the drum. In view of the foregoing, vapor deposition in free-span operation (without a drum) is preferred.

When observing the OVDs produced at 297° K under a microscope, a second much finer color-shift non-uniformity was discovered that was centered around asperities on the PET surface. Such asperities are common in most films and are due to factors such as slip agents and antioxidants added to the film resin, low molecular-weight components migrating to the film surface, and process parameters (rate of cooling, heat setting) used during extrusion and the biaxial orientation of the film. Thus, a second level of uniformity improvement was achieved by selecting substrate polymer films that had low levels of surface micro-roughness, specified in terms of lower film haziness in combination with higher gloss. Limiting the use of substrate films to those with low haziness and high gloss dramatically improved the color-shift properties identifiable by microscopic observation.

Several different PET film substrates were tested with thicknesses ranging from 125 micron to as low as 12 micron. In order to achieve uniform color-shifting properties with high intensity and depth of color, we found that the micro-roughness of the substrate, as defined by the level of haziness (measured according to ASTM D1003) and the level of gloss (measured according to ASTM D2457), needs to be at least less than 5% haziness and greater than 90% gloss, preferably less than 1% haziness and greater than 95% gloss.

In the process of identifying all major sources of color-shift non-uniformity, we also discovered that spatial differences in the emissivity of the various materials in the process space can affect the thickness uniformity of the layer deposited in vacuum. The monomer is vaporized and delivered by a nozzle located within millimeters of the moving substrate. The nozzle temperature is typically kept in the approximate 470° K-520° K range. As the monomer vapor exits the nozzle, it cools down due to expansion and, as it condenses, it transfers heat to the substrate. Thus, heat is exchanged between the substrate and mainly three sources: the monomer vapor, via condensation; the hot monomer nozzle, via radiation; and the process drum (if one is used), via conduction and radiation. The nozzle, the substrate (which, for the purposes of this discussion is understood to include one of the etalon layers) and the drum radiate energy according to the formula $$P = A \epsilon \sigma T^4, \qquad (1)$$

where P is power, A is the radiating surface area, $\epsilon$ is the emissivity of the surface material, $\sigma$ is the Stefan-Boltzmann constant, and T is temperature. Therefore, the emissivity of all materials in question is contributing to the temperature of the substrate and, as we discovered, to the overall uniformity of polymer spacer layer. It was surprising to find that screws in the face of the nozzle, dark color stains on the drum and discolorations on the nozzle surface all produced color-shift variations in the resultant OVDs. Such variations in the emissivity of the substrate (polymer film and one of the etalon layers) were not visually detectable and could only be measured with an instrument. Various emissivity measurements conducted on the different surfaces showed that emissivity variations higher than +/−0.1 (note that emissivity is defined as a unitless quantity measured in the range between 0 and 1.0) caused detectable color-shift changes in the OVD products. Such emissivity variations produced variations in the heat absorbed by the substrate from the monomer layer that caused non-uniform condensation and re-evaporation of the monomer, thereby yielding variations in the thickness of the layer and corresponding color-shift variations in the OVD.

Thus, we learned that physical conditions ignored in the prior art when coating various substrates with vapor-deposited polymer layers are significant when forming polymer spacer layers in OVDs for security applications where color uniformity and reproducibility are necessary specifications. For example, if the deposition of the etalon polymer spacer layer occurs on a free-span system, poor tension and wrinkles on the substrate in the deposition space will also affect the polymer layer thickness. Inasmuch as the web is introduced into the vacuum chamber at room temperature and it is exposed to the hot nozzle that deposits vaporized monomer, it is expected that small variations in the distance of the web from the nozzle will result in different deposition densities as well as different temperature gradients, all of which contribute to thickness non-uniformities.

Figure 3:
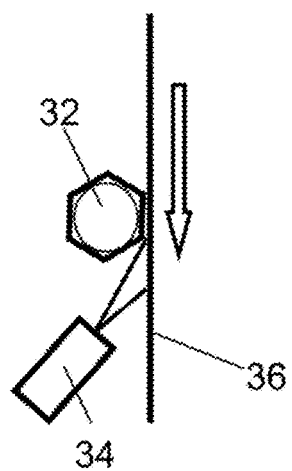
FIG. 3 is a schematic representation of a free-span deposition system wherein the electron gun is pointed directly toward the deposition nozzle in order to produce immediate polymerization and minimize monomer re-evaporation.

The monomer formulations used to form the etalon spacer layer for OVDs vary greatly depending on requirements such as adhesion to the two metallic reflective layers, mechanical properties of the polymer layer, and equipment-related limitations. A wide range of molecular weights of the monomer materials can be used to form OVDs (from 50 to 5000 or higher). Lower-weight monomers are expected to re-evaporate to some greater degree between the time they are deposited on the substrate and the time they are cured, thereby presenting another potential source of non-uniform deposition. Therefore, according to the invention, the time between deposition and curing is reduced either by increasing the speed of the substrate or by shortening the distance between the evaporator nozzle and the curing device, or both. As illustrated in FIG. 3 in free-span configuration, we found that the curing device can advantageously be pointed directly toward the nozzle, thereby practically eliminating any delay between vapor deposition and the start of polymerization. This effect is more marked as the molecular weight of the monomer is reduced.

Figure 4:
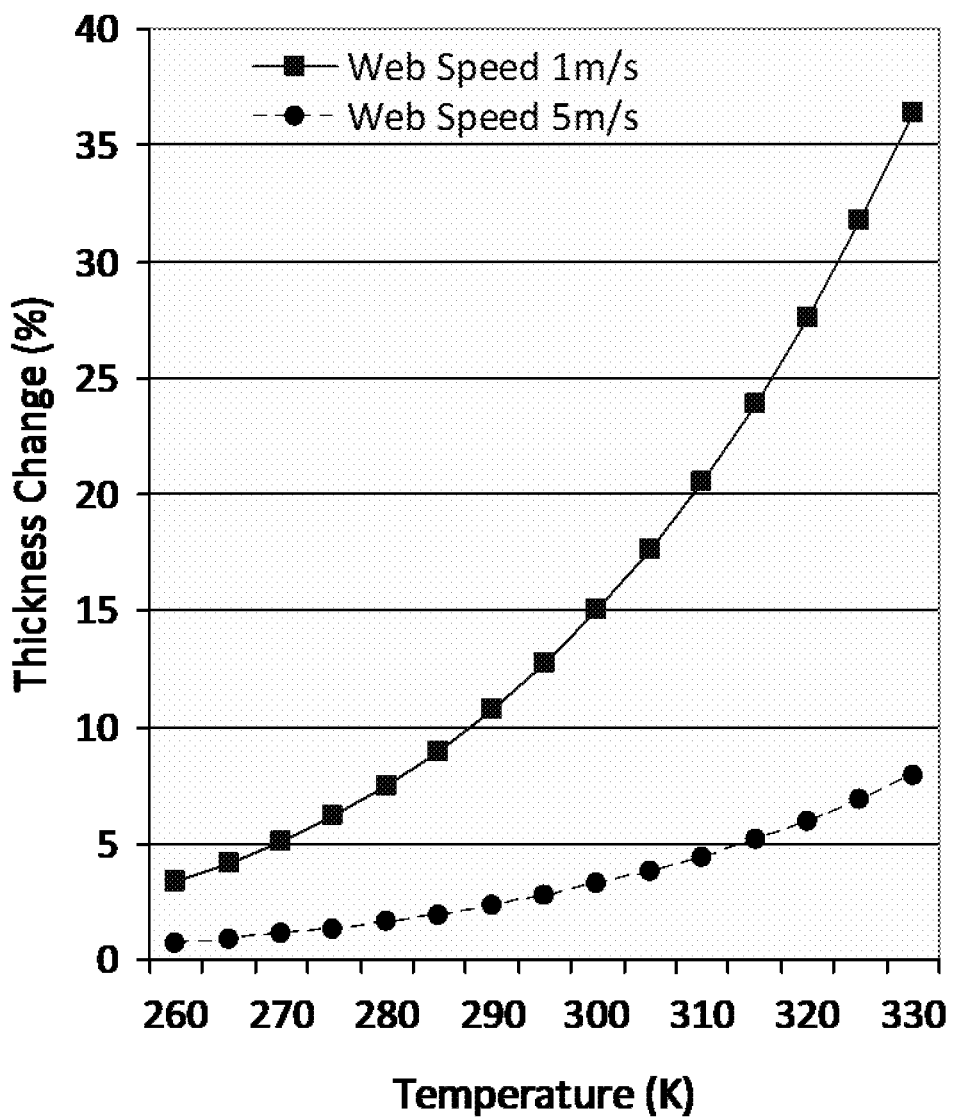
FIG. 4 is a plot illustrating the theoretical rate of monomer re-evaporation prior to polymerization as a function of substrate temperature.

Theoretically, the re-evaporation rate of a deposited monomer can be approximated assuming the monomer vapor is in thermal equilibrium (see S. Dushman, *Scientific Foundations of Vacuum Technique*, J. M. Lafferty Editor, John Wiley and Sons, chapter 10, pp. 691-703, 1962). This assumption leads to the equation $$W=10^{(C-0.5(\log(T))-B/T)}, \quad (2)$$

where W is re-evaporation rate, C and B are Antoine Coefficients for the particular monomer, and T is substrate temperature. Equation 2 was used to calculate the expected re-evaporation (measured by thickness changes in the deposited layer) of a 0.5 micron monomer layer at two different web speeds (1 m/s and 5 m/s, with correspondingly two different time delays between deposition and curing by electron-beam exposure). The selected monomer was 1,6 hexane diol diacrylate (available from Sartomer Corporation of Exton, Pa.) with a molecular weight of 226 and a refractive index n=1.456, which is representative of the monomer formulations used in the art. As shown in FIG. 4, the re-evaporation rate increases with temperature and with time delay before the monomer is polymerized. A mass balance was performed experimentally by depositing a monomer layer at 1 m/s on a process drum chilled to 265° K (no web). After 30 minutes of deposition the polymer layer was collected from the surface of the drum and its weight was compared to the total monomer weight. It showed that approximately 95% of the deposited monomer was converted into polymer (i.e., about 5% was re-evaporated), which is consistent with the numerical calculation.

The numerical analysis of FIG. 4 confirms that small changes in temperature can generate significant differences in the thickness of the deposited monomer layer. Therefore, the degree of uniformity of the substrate's temperature prior to curing is an important factor also with regard to the contribution of re-evaporation to the overall uniformity of the thickness of the spacer layer produced by vapor deposition.

During the course of experimenting with the various factors that affect spacer-layer-thickness uniformity, it became apparent that a thickness variation greater than about 5% over the surface area of the OVD would create an unacceptable product and that a variation less than 1% is required to ensure that color-shift non-uniformities are not discernible by the human eye. Accordingly, the process of vapor deposition of the polymeric spacer layer needs to be carried out under conditions that ensure this degree of uniformity in the thickness of the spacer layer. With regard to curing delay (defined for the purposes of this disclosure as the time delay between deposition and start of curing by radiation or other means), we found that a period of less than 2 seconds after monomer deposition ensures that the re-evaporation effects produce an acceptable thickness distribution for most monomers formulations. Ideally, as illustrated in the free-span set-up of FIG. 3, the delay between deposition and cure should be reduced to as small a time as possible. Given the wide range of molecular weights suitable for OVD spacer layer applications, we also found that with high vapor pressure monomers it is desirable to perform the monomer evaporation at ambient pressures (vacuum) as high as 1 torr to minimize the pressure effect on re-evaporation. Therefore, if all three etalon layers are deposited in-line in a vacuum chamber, it is best to conduct the stages of deposition in differentially pumped vacuum compartments.

A wide range of monomer formulations were tested in an attempt to combine mechanical integrity (flexibility of the polymer layer and bonding to the adjacent etalon layers) with color uniformity. For example, a monomer formulation consisting of 60 parts (by weight) of beta carboxylethyl acrylate and 40 parts (by weight) of a trifunctional acid ester, with refractive index n=1.47, proved to be quite reactive with all metals used for the adjacent etalon layers (chromium stainless steel and aluminum), resulting in excellent bonding. However, due to its relatively high vapor pressure (measured experimentally by monitoring the pressure rise in the chamber during the flash evaporation process), this formulation was quite unforgiving when it came to color variation due to small temperature variations on the substrate. A high substrate temperature uniformity and a curing delay of less than 1 second was required to obtain OVDs with acceptable color uniformity.

We found that a significant aspect in accomplishing good bonding to the metal surface is the addition into the monomer formulation of reactive monomers with acidic, basic, or highly polar functional groups that react with the metal surface. To that end, OVDs were made using various monomer formulations that included the following monomers/oligomers, some of which are also referenced in the examples below: (molecular weight MW and refractive index n are indicated when known) beta carboxy ethyl acrylate, MW=144, n=1.470, acidic acrylate oligomer, MW=240, n=1.459; vinyllimidazole, MW=94, n=1.533, bifunctional epoxy terminated monoacrylate, MW=128, n unknown; trifunctional acid ester, MW>200, n=1.470; acrylated polyester adhesion promoter, MW and n unknown; zinc diacrylate, MW unknown, n=1.519, di-trimethylolpropane tetraacrylate, MW=482, n=1.476, propoxylated (2) neopentyl glycol diacrylate, MW=328, n=1.446, 4-tert-butylcyclohexyl acrylate, MW=210, n=1.465; dipropylene glycol diacrylate, MW=242, n=1.450, 1,6 hexanediol diacrylate, MW=226, n=1.456, ethoxylated bisphenol a diacrylate, MW=468, n=1.543, lauryl acrylate, MW=240, n=1.442, tripropylene glycol diacrylate MW=300, n=1.448; acidic acrylate oligomers (high MW, n unknown); Zonyl TM/TA-N, average MW=500-600, n=1.358.

Observation of color uniformity of the OVDs teaches that a monomer property such as molecular weight cannot be singled out as a limiting factor as taught by the prior art, as long as the equipment is capable of evaporating it and the ambient pressure and substrate temperature allow it to condense. What was discovered instead is that a monomer formulation for producing uniform polymer based OVDs should be chosen based on the following: its ability to be flash evaporated (a parameter that depends mostly on equipment); its ability to react with the adjacent etalon layers to promote bonding; its ability to condense on a substrate; and a series of factors that affect its re-evaporation from the substrate, such as time delay to cure, ambient pressure as it affects the re-evaporation rate, and substrate temperature uniformity. Formulations with lower refractive index are also more preferable because they result in higher color travel (a term used in the art to refer to the effect of a material's refractive index) which is more forgiving when minor variations in travel length are present. A refractive index less than 1.6, and preferably lower, has been found to be optimal for the purposes of the invention.

Optically variable devices were formed by depositing an etalon structure on a 2-mil thick PET film substrate with haziness of 5% or higher and gloss of 90% or lower. The PET film was first coated with a chromium layer that had an optical density of 0.44 and an emissivity of 0.7 when measured from the chrome surface, which includes the effect of the PET film. The variation in emissivity across the deposition area was greater than +/−0.1 in all cases. A monomer material consisting of 60 parts beta carboxylethyl acrylate and 40 parts tri-functional acid ester was flash-evaporated at a fixed rate and deposited onto the Cr coated PET substrate at substrate speeds varying from 0.5 msec to 1.2 msec. The monomer layer was electron-beam cured within 2 seconds of deposition and a relatively opaque aluminum layer with an emissivity of 0.03 and optical density OD>2.5 was deposited on the polymer layer. The thickness of the deposited polymer layer was varied as a function of the web speed and a series of optically variable devices were formed (when viewed through the chromium layer). In all cases the color-shift variation of the product was unacceptable, showing the importance of operating with an emissivity variation of about +/−0.1 across the entire process deposition area.

Upon examination of color-shifts of interest, such as magenta to green and green to magenta, the color varied when viewed with the naked eye with variations in the emissivity of the chromium/PET layer. Microscopically, the color varied in areas of high surface micro-roughness caused by the relatively high haziness and low gloss off the PET substrate. The bonding of the polymer layer to the chromium layer was very good.

When running the same experiment with a lower vapor pressure monomer consisting of tripropylene glycol diacrylate, the macroscopic color variation that was due to a difference in emissivity (and thus a difference in substrate temperature) was dramatically decreased, but the microscopic color variation due to the substrate surface microroughness remained the same. This formulation also resulted in poor adhesion to the chromium layer.

Various experiments were conducted where the monomer formulation was varied to minimize re-evaporation, to increase bonding to the partially transmitting, absorbing and reflective layers (such as Cr, SS and Al), to minimize the refractive index, and to optimize the substrate microroughness by varying the degree of haziness and percent of gloss. It is understood that the absorption characteristics of the materials affect the colors produced by the structures of the invention. The following examples illustrate conditions that produced OVD etalon spacer layers with a thickness variation of less than 5 percent. The refractive index of the monomer materials used in the examples is referenced above.

Example 1

This Example demonstrates that a substrate that has a significant level of microroughness, when leveled with a leveling layer, can produce OVDs without significant color variation. Optically variable devices were formed on a 1-mil (i.e., one thousandth of an inch) thick, 60-inch wide, PET film substrate with haziness of 5% or higher and gloss of 90% or lower. The PET film was first coated at a speed of 2.5 m/s with a 0.6-micron thick leveling polymer layer that was formed by deposition of a propoxylated (2) neopenty glycol diacrylate monomer on the PE film that was then cured with an electron beam curtain. A layer of aluminum was then deposited on the leveling layer with a uniform optical density of 0.35 and a uniform emissivity of 0.5 across PET web. The thin aluminum layer was then coated with a spacer layer composed of the same polymer as the leveling layer at web speeds of 0.6 msec to 1.2 msec. The spacer layer was then coated with a relatively opaque aluminum layer. Examination of OVDs with different colors showed that the leveling layer dramatically improved the micro-variation in color caused by the film surface microroughness.

Example 2

The conditions of example 2 were repeated except that a 30-inch wide PET film, 2-mil thick, with haze less than 1% and a gloss >95%, was coated with a chromium layer with uniform optical density of 0.4 across the film width and an emissivity of 0.65 with a variation of less than +/−0.06 across the 30" width. A monomer formulation consisting of 5% beta carboxy ethyl acrylate, 45% Zonyl TM/TA-N, 5% hexane diol diacrylate and 45% tripropylene glycol diacrylate were flash evaporated at a constant rate on the PET web that was maintained at room temperatrure and was moving at speeds of 0.6 msec to 1.2 m/sec. The monomer layer was polymerized using an electron beam curtain located in close proximity to the monomer deposition station so that the time between deposition and cure was less than 2 seconds. A series of OVD devices were produced by depositing the polymer layer followed by an opaque aluminum layer and exhibited the following color shifts:
  dark blue with little or no shift;
  light green shifting to silver;
  gold shifting to silver;
  magenta shifting to gold;
  blue shifting to a light red;
  green shifting to blue/purple;
  gold shifting to green;
  magenta shifting to green; and
  green shifting to magenta.
Upon examination of the color shifting devices, there was no significant macroscopic or microscopic variation in the color and the adhesion to the polymer layer to the chromium and aluminum layers was adequate.

Example 3

Optically variable devices were formed on a PET substrate, 12-micron thick, with a haziness of less than 1% and a gloss higher than 95%. A stainless steel layer was deposited on the PET substrate, with an average emissivity of 0.66 and an optical density OD=0.5. The emissivity variation was less than 0.05 across the deposition area. A monomer formulation consisting of 95 parts of propoxylated neopentyl glycol diacrylate and 5 parts of an acidic acrylate oligomer was used, designed to decrease the thermal sensitivity of the monomer and provide metal adhesion. The monomer was condensed on the SS substrate at a web speed of 5 m/sec. The condensed monomer layer was electron-beam cured within 2 seconds of deposition and a relatively opaque aluminum layer. An optical interferometer with two sensing heads across the polymer web was used to measure the color and control the polymer layer thickness. The thickness of the deposited polymer layer was varied to form the color shift patterns as listed in Example 1. All optically variable devices exhibited no significant macroscopic and microscopic color-shift variation, while the adhesion to the substrate was good.

Example 4

The conditions of Example 2 were repeated using a monomer formulation consisting of 40 parts of propoxylated neopentyl glycol diacrylate, 50 parts of an acidic acrylate oligomer and 10 parts of di-trimethylolpropane tetra acrylate. The web speed was fixed at 5.8 m/s and an optical interferometer was set to produce a magenta to green color shift. The optically variable device did not exhibit significant macro and microscopic color variations and the adhesion to both SS and aluminum was good.

Example 5

With the same conditions of Example 4, the SS layer was plasma treated prior to the deposition of the monomer layer. An 80%/20% of Ar/O$_2$ plasma was used with 10 KW power. The plasma treatment step provided excellent adhesion of the polymer layer to the SS.

Example 6

With the conditions of Example 5, the polymer layer was plasma treated before the deposition of the aluminum layer. An 80%/20% of Ar/O$_2$ plasma was used with 10 KW power. The plasma treatment step provided excellent adhesion of the Al layer to the polymer layer.

The foregoing shows that the material physical properties and the process conditions present during the deposition of polymeric layers forming the spacer layer of etalon structures used for OVD applications can be controlled to produce layers of uniform thickness, as necessary to ensure uniform color-shifting effects. Most important to achieve good results are a curing delay less of than about 2 seconds, an emissivity variation of the surface on which the polymer layer is deposited of less than +/−0.1, a substrate haze factor less than 5%, and a substrate gloss greater than 90%.

As one skilled in the art will readily appreciate, the etalon spacer layers deposited accorded to the invention for OVD applications may by formed with a large variety of polymerizable compounds, either as single monomers or in formulations of more components. These monomers generally have molecular weights in the range of approximately 50 to 5000 and include the following.

1. Acrylated monomers with various degrees of functionality, e.g. monoacrylates, diacrylates, tri and tetra acrylates. For example, a diacrylate monomer may have the following composition

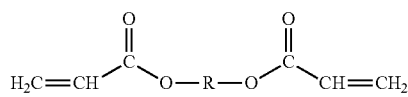

Where R is a functional chemical group such as aliphatic, cyclo-aliphatic, aromatic, and it may be a pure hydrocarbon, halogenated, metalated, etc.

2. Alcohols such as allyl, methallyl, crotyl, 1-chloroallyl, 2-chloroallyl, cinnamyl, vinyl, methylvinyl, 1-phenallyl and butenyl alcohols; and esters of such alcohols with (i) saturated acids such as acetic, propionic, butyric, valeric, caproic and stearic, (ii) unsaturated acids such as acrylic, alpha-substituted acrylic (including alkylacrylic, e.g., methacrylic, ethylacrylic, propylacrylic, and the like, and arylacrylic such as phenylacrylic), crotonic, oleic, linoleic and linolenic; (iii) polybasic acids such as oxalic, malonic, succinic, glutaric, adipic, pimelic, suberic, azelaic and sebacic; (iv) unsaturated polybasic acids such as maleic, fumaric, citraconic, mesaconic, itaconic, methylenemalonic, acetylenedicarboxylic and aconitic; and (v) aromatic acids, e.g., benzoic, phenylacetic, phthalic, terephthalic and benzoylphthalic acids.

3. Acids and esters with lower saturated alcohols, such as methyl, ethyl, propyl, isopropyl, butyl, isobutyl, sec-butyl, tert-butyl, 2-ethylhexyl and cyclohexyl alcohols, and with saturated lower polyhydric alcohols such as ethylene glycol, propylene glycol, tetramethylene glycol, neopentyl glycol and trimethylolpropane.

4. Lower polyhydric alcohols, e.g., butenediol, and esters thereof with saturated and unsaturated aliphatic and aromatic, monobasic and polybasic acids, examples of which appear above.

5. Esters of the above-described unsaturated acids, especially acrylic and methacrylic acids, with higher molecular weight monohydroxy and polyhydroxy materials such as decyl alcohol, isodecyl alcohol, oleyl alcohol, stearyl alcohol, epoxy resins and polybutadiene-derived polyols.

6. Vinyl cyclic compounds including styrene, o-, m-, p-chlorostyrenes, bromostyrenes, fluorostyrenes, methylstyrenes, ethylstyrenes and cyanostyrenes; di-, tri-, and tetrachlorostyrenes, bromostyrenes, fluorostyrenes, methylstyrenes, ethylstyrenes, cyanostyrenes; vinylnapthalene, vinylcyclohexane, divinylbenzene, trivinylbenzene, allylbenzene, and heterocycles such as vinylfuran, vinylpridine, vinylbenzofuran, N-vinylcarbazole, N-vinylpyrrolidone and N-vinyloxazolidone.

7. Ethers such as methyl vinyl ether, ethyl vinyl ether, cyclohexyl vinyl ether, octyl vinyl ether, diallyl ether, ethyl methallyl ether and allyl ethyl ether.

8. Ketones, e.g., methyl vinyl ketone and ethyl vinyl ketone.

9. Amides, such as acrylamide, methacrylamide, N-methylacrylamide, N-phenylacrylamide, N-allylacrylamide, N-methylolacrylamide, N-allylcaprolatam, diacetone acrylamide, hydroxymetholated diacetone acrylamide and 2-acrylamido-2-methylpropanesulfonic acid.

10. Aliphatic hydrocarbons; for instance, ethylene, propylene, butenes, butadiene, isoprene, 2-chlorobutadiene and alpha-olefins in general.

11. Alkyl halides, e.g., vinyl fluoride, vinyl chloride, vinyl bromide, vinylidene chloride, vinylidene bromide, allyl chloride and allyl bromide.

12. Acid anhydrides, e.g., maleic, citraconic, itaconic, cis-4-cyclohexene-1,2-dicarboxylic and bicyclo(2.2.1)-5-heptene-2,3-dicarboxylic anhydrides.

13. Acid halides such as cinnamyl acrylyl, methacrylyl, crotonyl, oleyl and fumaryl chlorides or bromides.

14. Nitriles, e.g., acrylonitrile, methacrylonitrile and other substituted acrylonitriles.

15. Monomers with conjugated double bonds.

16. Thiol monomers.

17. Monomers with allylic double bonds.

18. Monomers with epoxide groups.

For applications where an image is formed on the OVD by patterning one of the reflective layers, such condition may impose additional constraints on the polymer formulation. Forming an image on an ODV can be accomplished by removing one or both of the reflective layers in a particular pattern that is visible with a naked eye or a microscope. There are several methods used to pattern such a reflective layer, including laser etching, scribing, acid etching and alkaline solution etching. Acrylate polymers can be chemically attacked by high PH alkaline solutions and damage to the acrylate layer may result in etching patterns where the lines are jagged and the image distorted. For such applications, notable improvements have been achieved using a polymer formulation where the polymer chemistry includes one or more of the following properties: (a) high resistance to alkaline solutions, (b) high phobicity to aqueous solutions and (c)

high glass transition chemistry. Based on these principles, experimental work has been done with success to produce sharp images by alkaline etching of an aluminum reflective layer where the polymer formulations included a hydrophobic monomer to provide hydrophobicity. A two-layer polymer structure was also used with good results where the polymer layer adjacent to the etched aluminum layer was either a thin hydrophobic layer or a thin layer highly resistant to damage by exposure to an alkaline solution (or both). Monomers for such formulations include fluorine- and silicon-containing chemistries.

The two layers on either side of the polymer layer that are required to produce the etalon structure of the invention may similarly be chosen from a wide variety of materials depending on the application and environmental conditions to which the OVD is expected to be exposed. For most applications the thinner and more transmissive layer has to have a certain level of corrosion resistance; therefore, metals that are sensitive to corrosive conditions (high humidity and temperature) such as aluminum, copper, zinc, tin, etc., are not appropriate. Corrosion resistant metals and alloys such chromium, stainless steel, nickel, nichrome, tungsten, palladium, titanium, vanadium, molybdenum, cobalt, Inconel®, hastalloy, etc. are more appropriate. Also materials such as metal nitrides, oxides, and carbides (for example silicon carbide, aluminum carbide, titanium carbide, titanium nitride, nickel carbide, etc.) provide both corrosion stability and increased absorption, which can impact the chroma, saturation and hue of color. The thicker and more opaque layer may be chosen from a broader range of metals including aluminum, copper, zinc, tin and other metals that can be evaporated onto a polymer and have a significant level of reflectivity.

While the invention has been shown and described herein in what is believed to be the most practical and preferred embodiments, it is recognized that departures can be made therefrom within the scope of the invention. For example the leveling layer used in Example 1, if cross linked, can also function as a heat-resistant layer, which will make the substrate less susceptible to heat damage during the subsequent high-temperature deposition. Such heat protection would also enable the use of very thin substrate films, as needed for applications where flexibility of the OVS is important, such as in banknotes. Furthermore, it is conceivable that under particular conditions the deposition of the polymer layers used in this invention may be accomplished by a different liquid-monomer deposition process such as, for example, roll coating or atmospheric vapor deposition followed by polymerization.

Therefore, the invention is not to be limited to the details disclosed herein but is to be accorded the full scope of the claims so as to embrace any and all equivalent processes and products.

We claim:

1. A method for producing an optically variable device (OVD), the method comprising:
   adhering an optically-transmissive polymeric layer with a first layer of partially reflective, partially absorptive, and partially transmissive material; and
   adhering a second layer of partially reflective, partially absorptive, and partially transmissive material to said optically-transmissive polymeric layer to form a multi-layer etalon structure in which, across an entire area of the OVD, said optically-transmissive polymeric layer is an etalon spacer layer between said first and second layers,
   wherein said optically-transmissive polymeric layer is formed in vacuum by depositing a monomeric layer and radiation curing said monomeric layer within 2 seconds after its deposition and under conditions that result in (i) a maximum variation in thickness thereof not exceeding 5 percent across the entire surface area of the OVD and (ii) minimization of differential re-evaporation of said monomeric layer.

2. A method according to claim 1, further comprising adhering said OVD onto a flexible substrate.

3. A method according to claim 2, further comprising adhering a leveling layer onto said flexible substrate.

4. A method according to claim 2, wherein the adhering said OVD onto a flexible substrate includes adhering said OVD onto a flexible substrate that has a haze factor of less than 5 percent.

5. A method according to claim 2, wherein the adhering said OVD onto a flexible substrate includes adhering said OVD onto a flexible substrate that has a haze factor of less than 1 percent.

6. A method according to claim 2, wherein the adhering said OVD onto a flexible substrate includes adhering said OVD onto a flexible substrate that has a gloss value of greater than 90 percent.

7. A method according to claim 2, wherein the adhering said OVD onto a flexible substrate includes adhering said OVD onto a flexible substrate that has a gloss value of greater than 95 percent.

8. A method according to claim 1, wherein said first layer of partially reflective, partially absorptive, and partially transmissive material has surface emissivity value that does not vary by more than +/−0.1 across said entire area.

9. A method according to claim 1, wherein said optically-transmissive polymeric layer has a refractive index smaller than 1.6 and wherein no spatial variation in color-shifting, which is caused by non-uniformity of a thickness profile of said polymeric layer, is visually perceivable with a naked eye.

10. A method according to claim 1, further comprising incorporating said OVD into an item selected form the group consisting of a banknote, a security label, and an article of value.

11. A method according to claim 1, further comprising selecting a thickness of said optically-transmissive polymeric layer to produce, as a function of angle of incidence of ambient light onto the OVD, a visually-perceivable shift of color of said ambient light reflected by the OVD between green and silver.

12. A method according to claim 1, further comprising selecting a thickness of said optically-transmissive polymeric layer to produce, as a function of angle of incidence of ambient light onto the OVD, a visually-perceivable shift of color of said ambient light reflected by the OVD between magenta and gold.

13. A method according to claim 1, further comprising selecting a thickness of said optically-transmissive polymeric layer to produce, as a function of angle of incidence of ambient light onto the OVD, a visually-perceivable shift of color of said ambient light reflected by the OVD between blue and red.

14. A method according to claim 1, further comprising selecting a thickness of said optically-transmissive polymeric layer to produce, as a function of angle of incidence of ambient light onto the OVD, a visually-perceivable shift of color of said ambient light reflected by the OVD between green and blue.

15. A method according to claim 1, further comprising selecting a thickness of said optically-transmissive polymeric layer to produce, as a function of angle of incidence of ambient light onto the OVD, a visually-perceivable shift of color of said ambient light reflected by the OVD between gold and green.

16. A method according to claim 1, further comprising selecting a thickness of said optically-transmissive polymeric layer to produce, as a function of angle of incidence of ambient light onto the OVD, a visually-perceivable shift of color of said ambient light reflected by the OVD between magenta and green.

17. A method for producing an optically variable device (OVD), the method comprising:
  adhering an optically-transmissive polymeric layer with a first layer of partially reflective, partially absorptive, and partially transmissive material, and
  adhering a second layer of partially reflective, partially absorptive, and partially transmissive material to said optically-transmissive polymeric layer to form a multi-layer etalon structure in which, across an entire area of the OVD, said optically-transmissive polymeric layer is an etalon spacer layer between said first and second layers,
  wherein said optically-transmissive polymeric layer is formed in vacuum by depositing a monomeric layer and radiation curing said monomeric layer within 2 seconds after its deposition and under conditions that result in (i) a maximum variation in thickness thereof not exceeding 5 percent across the entire surface area of the OVD, and (ii) minimization of differential re-evaporation of said monomeric layer, and
  wherein said OVD is adhered onto a substrate that has a gloss value greater than 90%.

18. A method according to claim 17, wherein said substrate has a haze factor of less than 5 percent, and wherein the OVD does not exhibit spatial variations in color-shifting that are caused by non-uniformity of a thickness profile of said polymeric layer and that are visually perceivable with a naked eye.

19. A method for producing an optically variable device (OVD), the method comprising:
  adhering an optically-transmissive polymeric layer with a first layer of partially reflective, partially absorptive, and partially transmissive material, wherein the first layer has an emissivity variation less than +/−0.1 across the first layer,
  adhering a second layer of partially reflective, partially absorptive, and partially transmissive material to said optically-transmissive polymeric layer to form a multi-layer etalon structure in which, across an entire area of the OVD, said optically-transmissive polymeric layer is an etalon spacer layer between said first and second layers,
  wherein said optically-transmissive polymeric layer is formed in vacuum by depositing a monomeric layer that is radiation cured within 2 seconds after its deposition and under conditions that ensure a maximum variation in thickness thereof not exceeding 5 percent across an entire surface area of the OVD.

20. A method according to claim 19, wherein said optically-transmissive polymeric layer is formed in vacuum by depositing a monomeric layer under conditions that result in minimization of differential re-evaporation of said monomeric layer.

* * * * *